(No Model.) 2 Sheets—Sheet 2.
T. P. RANDALL.
CAR BRAKE.
No. 407,033. Patented July 16, 1889.
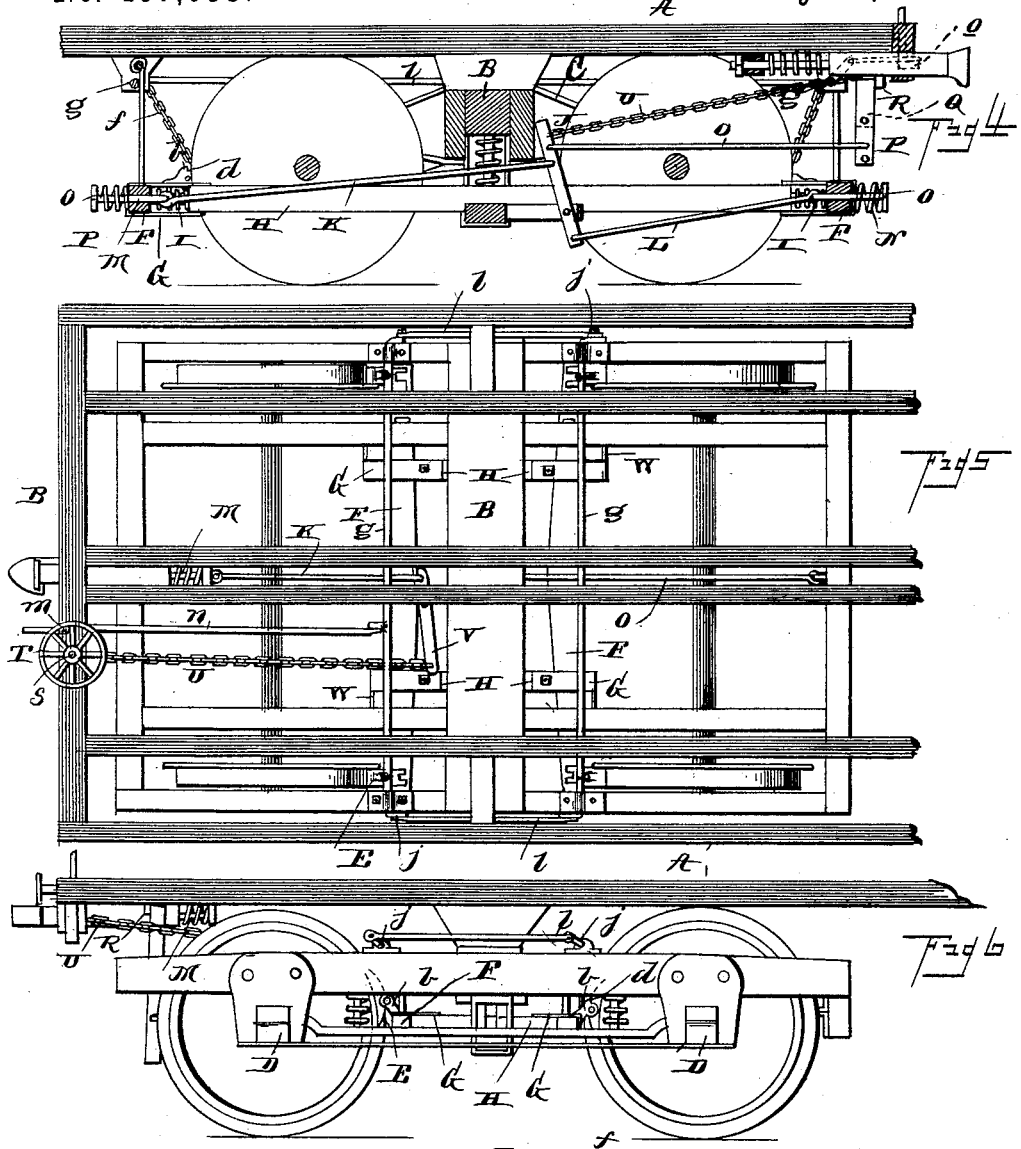
Witnesses
John Imirie
R. W. Bishop
Inventor
Timothy P. Randall
By his Attorneys

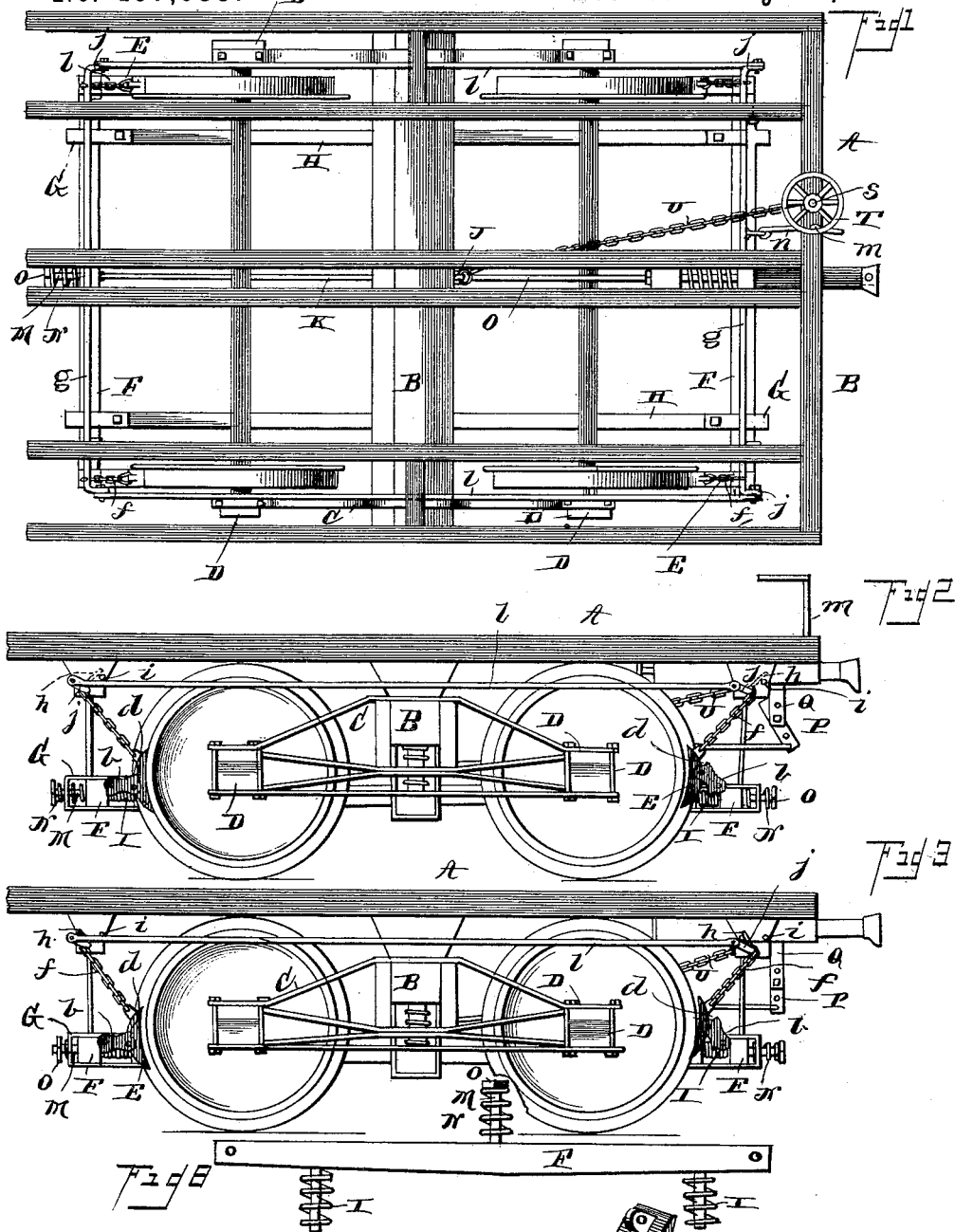

UNITED STATES PATENT OFFICE.

TIMOTHY P. RANDALL, OF ADRIAN, MICHIGAN.

CAR-BRAKE.

SPECIFICATION forming part of Letters Patent No. 407,033, dated July 16, 1889.

Application filed March 12, 1889. Serial No. 303,016. (No model.)

*To all whom it may concern:*

Be it known that I, TIMOTHY P. RANDALL, a citizen of the United States, residing at Adrian, in the county of Lenawee and State of Michigan, have invented new and useful Improvements in Car-Brakes, of which the following is a specification.

My invention relates to improvements in car-brakes; and it consists in certain novel features hereinafter described and claimed.

In the accompanying drawings, Figure 1 is a plan view showing my improved brake applied to the truck of a freight-car. Fig. 2 is a side view of the same, showing the brake applied. Fig. 3 is a similar view showing the brake off the wheels. Fig. 4 is a longitudinal section. Fig. 5 is a plan view showing the brake applied to the truck of a passenger-car. Fig. 6 is a side view of the same. Fig. 7 is a longitudinal section of the same. Fig. 8 is a detail view of one of the transverse sliding bars, and Fig. 9 is a detail perspective view of one of the brake-shoes.

The truck A may be of any desired construction, and is provided with the usual transverse beam B, to the ends of which the braces C, carrying the journal-boxes D, in which the axles are mounted, are secured.

The brake-shoes E are supported by transverse beams F, and are adapted to bear against the wheels above the horizontal plane of their axles, so as to bind against the wheels and retard the motion of the same in the usual manner. In the truck of a freight-car these transverse beams or sliding bars F are mounted in loops G, secured to the ends of longitudinal beams H, which extend to the ends of the truck, so that the shoes will be arranged to the outer sides of the wheels; and in the truck of a passenger-car the said transverse sliding bars F are mounted in the ends of similar longitudinal beams, but the said longitudinal beams do not extend to the ends of the truck, so that the shoes will be arranged at the inner sides of the wheels, as clearly shown. These bars are normally projected outward in the loops by the springs I, arranged in the ends of the beams H and bearing on the said transverse bar. The brakes are applied by causing these sliding bars to move in the loops G toward the wheels, as will be readily understood, and this sliding movement of the said bars is automatically effected by the contact of the bumpers or draw-heads on the ends of the cars through the mechanism which I will now proceed to describe.

An oscillating lever J is mounted vertically on the truck and is connected by the rods K L with the sliding bars F, as shown, so that when the said lever is operated the sliding bars will be moved in contrary directions. The ends of these rods K L are engaged in eyebolts M, which are mounted loosely in the sliding bars and have springs N coiled around their outer ends between the bars and the nuts O, mounted on their extremities. These springs serve as cushions for the said sliding bars. The lever J is connected by a connecting-rod O with a lever P, which is pivoted in a bracket depending from the under side of the truck, and the upper end of this lever is arranged in the path of a lug R on the bottom of the draw-head. When the cars are made to approach and the draw-heads brought together, the draw-heads will be forced backward, and the lever thereby operated to apply the brakes, as will be readily understood on reference to the drawings. In order that the brakes may be operated by hand, when so desired, I provide on the platform a vertical rotary shaft S, provided with a hand-wheel T at its upper end, and the lower end of the said rotary shaft is connected by a chain U with the upper end of the oscillating lever J, as shown.

The mechanism just described is that employed when the brake is applied to a freight-car. The mechanism employed when the device is applied to a passenger-car is substantially the same, but is arranged in a slightly-different manner. In this form the vertical oscillating levers are arranged at the ends of the truck and the connecting-rods extend inward to the transverse sliding bars. The chain extending from the vertical rotary shaft at the end of the platform is connected to one end of a horizontal oscillating lever V, so that the proper motion will be imparted to the sliding bars to apply the brake-shoes to the wheel. In this arrangement, also, instead of the coiled springs I at the end of the longitudinal beams I have shown the leaf-springs W, secured to the upper portion of the truck and depending therefrom and having their lower ends bearing on the sliding bars.

The brake-shoes $a$ are pivotally secured to the outer ends of links $b$, which are pivoted at their opposite ends to the ends of the sliding bar F. This construction allows the shoes to be raised, so that they will not bind against the wheel, and also allows them to be easily lowered into position to act on the wheel. In order that the brake-shoes when lowered will be held effectually against the wheel, I provide the links $b$ with the abrupt shoulders $d$, adapted to bear against the rear side of the brake-shoes, and the abrupt shoulders $e$, adapted to bear against the transverse sliding bar F.

The brake-shoes are connected by chains $f$ with the transverse rock-shafts $g$, mounted in the truck and provided with the radial pins $h$, playing between the lateral stops or studs $i$ on the bearings of the said shaft. This radial pin and the lateral stops serve to limit the movement of said shafts. The said shafts are provided at their ends with the crank-arms $j$, which are connected by the longitudinal rods $l$, so as to secure a simultaneous movement of the rock-shafts at both ends of the truck. The said rock-shaft can be operated from the platform of the car by means of the vertical crank-shaft $m$, mounted in the platform and connected by a link $n$ with a crank-arm $o$ on one of the said shafts. The chains connecting the brake-shoes with the rock-shafts are secured to the rock-shafts in such a manner that when the rock-shafts are operated the brake-shoes at one end of the device will be raised so that they cannot be applied to the wheels, while the brake-shoes at the other end of the device will be lowered so as to be applied to the wheels. When the device is used on a passenger-car, the rock-shafts are arranged nearer the center of the truck, but are otherwise the same as the device as applied to a freight-car.

From the foregoing description, taken in connection with the accompanying drawings, it will be seen that I have provided a brake in which the shoes will be automatically applied to the wheels and in which the shoes can be quickly shifted, so that one or the other pair will act on the wheels, according to the direction in which the car is moving. When the draw-heads come together, the contact of the same upon each other will apply the brakes to the wheels in the usual manner, so as to stop the motion of the cars and prevent their becoming jammed. When it is desired, however, to stop the motion of a car which has been detached from the train, the brakes can be applied by hand, as before stated, in the usual manner. When the vertical oscillating lever is operated to apply the brakes, it is moved so as to draw the sliding bars carrying the brake-shoes toward the wheels and thereby apply the brake-shoes to the wheels. The springs acting on the sliding bar serve as cushions to prevent them applying the shoes to the wheels with such force as to jam the parts and thereby cause a breakage of the same.

The movement of the rock-shafts is limited, so as to prevent the links to which the brake-shoes are applied from being swung upward so far as to carry the brake-shoes away from the wheels to such an extent that they cannot be applied thereto.

Having thus described my invention, what I claim, and desire to secure by Letters Patent, is—

1. In a car-brake, the combination, with the transverse bars F, of the brake-shoes, and the links having their opposite ends pivoted to the said shoes and the said bar, as set forth.

2. In a car-brake, the combination of the transverse bars F, the brake-shoes, and the links having their opposite ends pivoted to the shoes and to the said bar, and provided with the shoulders $d$ $e$, adapted to bear against the brake-shoes and the said bar, as set forth.

3. In a car-brake, the combination of the longitudinal beams, the transverse bars mounted at the ends of said beams and carrying the brake-shoes, and the springs bearing on the transverse bars to throw the brake-shoes from the wheels, as set forth.

4. In a car-brake, the combination of the longitudinal beams, the transverse sliding bars mounted on said beams and carrying the brake-shoes, springs acting on the sliding bars and cushioning the same, mechanism for applying the brakes, and the springs for releasing the same, as set forth.

5. In a car-brake, the combination, with the truck and the transverse bars, of the brake-shoes loosely mounted on the transverse bars, the rock-shafts journaled on the truck, the chains connecting the brake-shoes with said rock-shafts, and the longitudinal rods connecting the rock-shafts, whereby the said shafts may be operated to hold the brake-shoes at one end of the truck out of contact with the wheel, while the brake-shoes at the other end may be applied to the wheel, as set forth.

6. The combination, with the truck and the transverse bars, of the brake-shoes loosely mounted on the transverse bars, the rock-shafts journaled on the truck and provided with radial pins playing between stops on its bearings and having crank-arms at its ends, the chains connecting the rock-shafts with the brake-shoes, and the longitudinal rods connecting the rock-shafts, as set forth.

In testimony that I claim the foregoing as my own I have hereto affixed my signature in presence of two witnesses.

TIMOTHY P. RANDALL.

Witnesses:
J. H. SIGGERS,
H. F. RILEY.